J. B. FLOGERZI.
MOVING PICTURE SCREEN AND PROCESS OF PRODUCING THE SAME.
APPLICATION FILED MAR. 3, 1915.
1,152,620.
Patented Sept. 7, 1915.
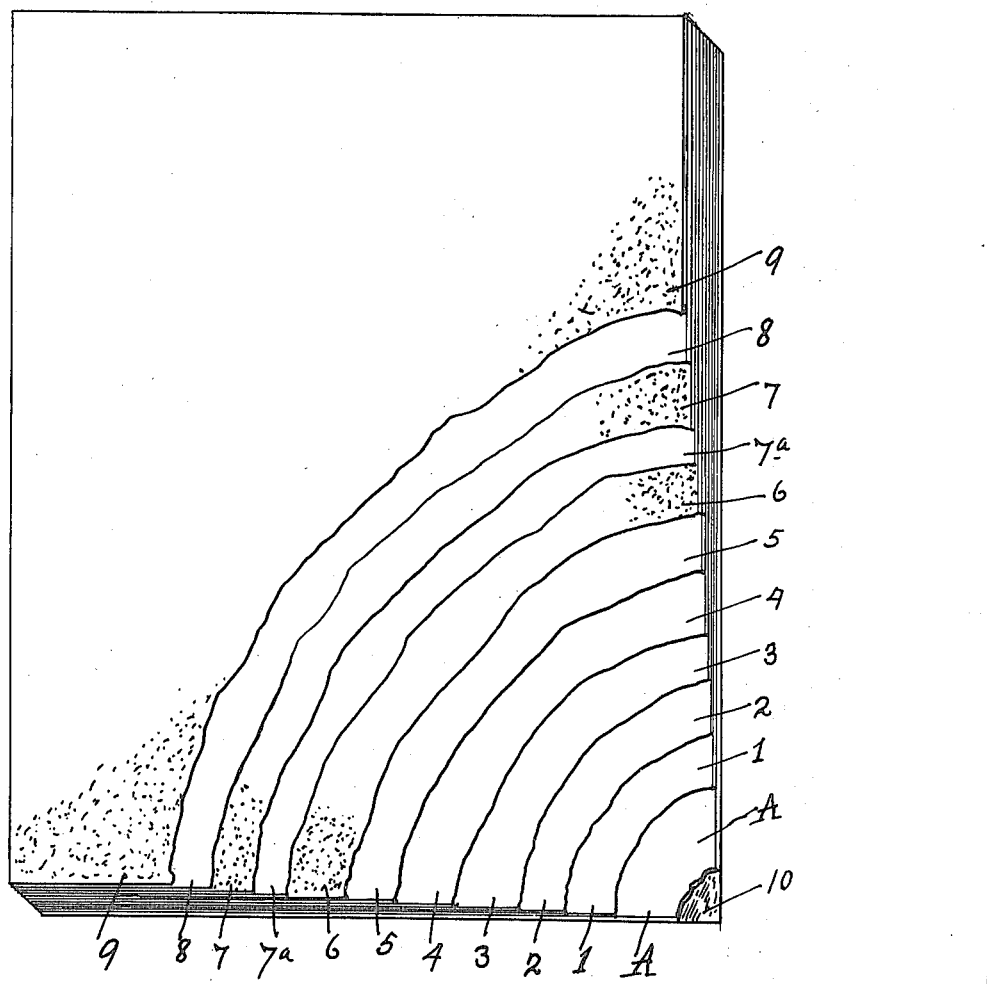
Witnesses
a. H. Opsahl
B. G. Wheeler
Inventor
John B. Flogerzi
By his Attorneys
Williamson Merchant

UNITED STATES PATENT OFFICE.

JOHN B. FLOGERZI, OF ST. PAUL, MINNESOTA, ASSIGNOR OF ONE-HALF TO JOHN T. SMITH, OF ST. PAUL, MINNESOTA.

MOVING-PICTURE SCREEN AND PROCESS OF PRODUCING THE SAME.

1,152,620.     Specification of Letters Patent.     Patented Sept. 7, 1915.

Application filed March 3, 1915. Serial No. 11,730.

*To all whom it may concern:*

Be it known that I, JOHN B. FLOGERZI, a citizen of the United States, residing at St. Paul, in the county of Ramsey and State of Minnesota, have invented certain new and useful Improvements in Moving - Picture Screens and Processes of Producing the Same; and I do hereby declare the following to be a full, clear, and exact description of the invention, such as will enable others skilled in the art to which it appertains to make and use the same.

My invention has for its object to provide an improved moving picture screen, and involves also an improved process for making the same.

In the moving picture art, the image is projected onto a screen which is usually white, or nearly white, but sometimes has a tinge of color. Usually, these screens have been a fabric or curtain, but in some instances, frosted mirrors have been employed. These frosted mirrors, when used as a screen for the above purpose, are more efficient than an ordinary fabric screen for the reason that a good image can be projected thereon with a current in the moving picture machine which is much lower than that required for projecting onto an ordinary fabric or non-reflecting screen. Such glass screens are, however, very expensive, and, moreover, are very easily broken.

My invention provides a flexible mirror screen which has all of the good qualities of plate glass mirrors or reflecting screens such as hitherto used, and which, at the same time, being flexible, is non-breakable and durable, and furthermore, may be produced at a comparatively low cost. Here it may be stated that the term "moving picture screen" is used in a broad sense to include, generally, screens upon which pictures are reproduced by light rays projected from a negative.

The improved screen is illustrated in the single view of drawing which is a perspective view with parts broken away, illustrating, in exaggerated thickness, the several layers of material which make up the improved screen.

The nature of my improved screen will be made clear by a statement of the process by which it is produced. This process, as preferably carried out, is as follows: For the flexible backing or body A of the screen, I preferably employ a cloth, such as "Indian Head," buckram, or coarse lining. As the first step of the process, this backing or body is given a coating 1, consisting of linseed oil with a little filler, such as crown white, zinc white or carbonate of magnesia. After this has dried, the backing is again stretched and given another or second coating 2, consisting of about one-third turpentine, one-third white lead, and one-third zinc white. After this surface has dried, it is sand papered smooth and the dust brushed off. The smooth surface is then given another coating 3 of paint consisting of rectified turpentine, zinc white ground in oil and crown or crimson white, this paint being applied, preferably, by stippling it on. After this coating has dried, it is again sand papered and dusted off. Then a fourth coat 4, consisting of rectified turpentine and zinc white and a little drier, is stippled on. Next, a coating of varnish 5, such as copal or spar or De Mar varnish, which dries flexible, is mixed with a little rectified turpentine and applied with a brush. The turpentine makes the varnish dry with a dull finish and without luster. When this varnish has dried to a viscous or sticky condition, it is sprayed with finely ground glass 6, and allowed to thoroughly dry, which requires usually about two days. This surface is then washed with distilled water to remove all iron or other ingredients that have a chemical action on silver or mercury. I next apply a coating of reflecting material 7, such as silver, mercury, or any of the well known so-called "mirror solutions." Preferably, silver dust or foil is applied by the use of an air brush; and when thus applied, the granulated glass surface should first be coated with an adhesive material $7^a$, such as copal varnish which furnishes the required adhesive. The above noted ground or granulated glass surface protects the metallic reflecting surface from the action of other materials. Next, I apply over the reflecting metallic surface, a coating 8 of copal or other suitable varnish, and to this varnished surface, while it is still in viscous or sticky condition, I apply a coating of fine glass particles 9, such as granulated glass or round glass pellets, such as "ballintino," either clear or frosted. The granulated glass is best for a screen that is to be used at short focus, while the glass pellets are best when the screen is to be used at long focus, as the latter give a greater reflection and greater depth to the picture, which is suitable for long range. When the face of the screen has been thus finished, I apply to the back of the fabric or backing, a coat 10 of paint which, preferably, consists of lamp black ground in oil with portions of white lead and ground asbestos. The asbestos is desirable because it assists in rendering the screen fire proof or non-combustible.

The reflecting metallic particles back of the outer coating of glass particles, give the desired reflection and depth to the picture. At the same time, the outer glass surface is so broken up that the light will be diffused and not reflected on any definite lines. The coating of granulated or ground glass back of the metal protects the metallic portions from the chemical action of metals contained in the first applied coats of paint. I thus obtain a flexible screen which not only has great strength and durability, and which may even be rolled without damage, but obtain a surface which has all of the desired qualities for a moving picture screen.

What I claim is:

1. As an article of manufacture, a moving picture screen comprising a backing, an adhesive coating applied on one face thereof, finely divided reflecting metal held by said adhesive coating, and a coating of finely divided glass applied over the said metallic coating.

2. As a new article of manufacture, a moving picture screen comprising a flexible backing, a coating of adhesive material and granulated glass applied to one face thereof, a coating of adhesive material and finely divided reflecting metal applied over said coating of granulated glass, and a coating of adhesive material and glass particles applied over said metallic coating.

3. As a new article of manufacture, a moving picture screen comprising a flexible backing, an adhesive coating of oil, paint and varnish applied to one face thereof, a coating of ground glass applied to the said adhesive coating, a coating of varnish applied over said ground glass coating, a coating of finely divided reflecting metal applied to said last noted varnish coating, a coating of varnish applied over said metallic coating, and a coating of fine glass particles applied to and held by the said last noted varnish coating.

4. As a new article of manufacture, a moving picture screen comprising a backing, an adhesive coating applied on one face thereof, finely divided reflecting metal held by said adhesive coating, a coating of finely divided glass applied over the said metallic coating, and a coat of paint applied on the back surface of said backing.

5. As a new article of manufacture, a moving picture screen comprising a flexible backing, a coating of adhesive material and granulated glass applied to one face thereof, a coating of adhesive material and finely divided reflecting metal applied over said coating of granulated glass and a coating of adhesive material and glass particles applied over said metallic coating, and a coating of paint consisting of lamp black ground in oil with portions of white lead and ground asbestos applied to the back surface of said flexible backing.

6. As a new article of manufacture, a moving picture screen comprising a flexible fabric backing, several coats including linseed oil, a suitable filler such as white lead, and a portion of turpentine applied on one face of the said backing, a coating of finely ground glass applied to and held by the said coating, a coating of finely divided reflecting metal next applied on the surface thereof, a coating of flexible varnish next applied on the surface thereof, and an outer coating of fine glass particles applied to and held by the said coating of flexible varnish.

7. The process of making moving picture screens, which consists in applying to a flexible backing, a coat consisting of linseed oil with a little filler such as crown white, zinc white, or carbonate of magnesia; after this coat has dried, stretching the backing and giving the same another coating consisting of turpentine and white lead or zinc; then giving the said surface another coating of paint consisting of rectified turpentine and zinc white ground in oil, and crown white, and allowing this coating to dry, then applying to the said surface a flexible varnish, and when this is dried to a sticky condition, in spraying finely ground glass onto the same and allowing said varnish to become dry; then washing this surface with distilled water to remove iron or other ingredients; next applying one or more coats of varnish, and to the same while in sticky condition applying a coating of finely divided reflecting metal such as silver or mercury; and finally, in applying one or more further coats of varnish and to this varnish, while in sticky condition, applying a coating of finely divided glass particles such as ground glass or glass pellets.

In testimony whereof I affix my signature in presence of two witnesses.

JOHN B. FLOGERZI.

Witnesses:
B. G. WHEELER,
HARRY D. KILGORE.